UNITED STATES PATENT OFFICE.

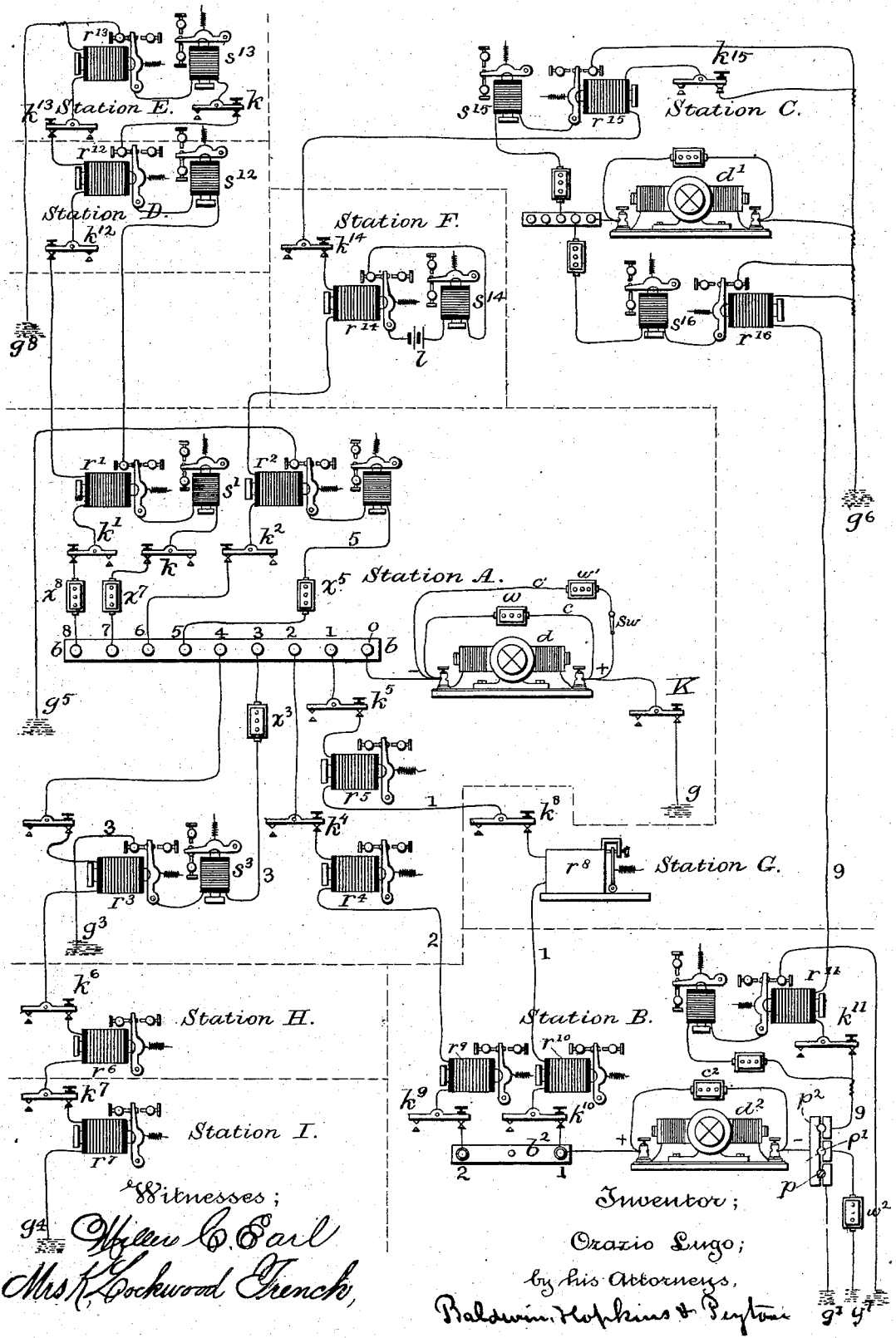

ORAZIO LUGO, OF NEW YORK, N. Y.

DYNAMO-ELECTRIC TELEGRAPH.

SPECIFICATION forming part of Letters Patent No. 238,298, dated March 1, 1881.

Application filed December 20, 1880. (No model.)

*To all whom it may concern:*

Be it known that I, ORAZIO LUGO, a citizen of the United States, residing in the city, county, and State of New York, have invented certain new and useful Improvements in Dynamo-Electric Telegraphy, of which the following is a specification.

My invention relates to that class of electric telegraphs in which dynamo-electricity is employed for the transmission of signals instead of voltaic electricity generated by chemical action.

In the application of dynamo-electric generators to the production of electric currents for telegraphic transmission, certain difficulties have been encountered, arising from the presence of conditions which do not exist in the various forms of voltaic batteries which have heretofore usually been employed as sources of electrical power. In the case of the chemical batteries employed for telegraphy, the resistance of the circuit or circuits exterior to the battery is very considerable, while the electro-motive force remains practically constant, thus producing a working current of uniform strength in the circuit or circuits connected with the battery. In the case of dynamo-electric generators in which the reaction principle is employed the introduction into the circuit of a high external resistance, consisting of telegraph-lines which are alternately broken and closed at irregular and arbitrary intervals for signaling purposes, produces wide variations in the resistance, and subjects them to great variations in the electro-motive force, which variations are due to changes in the intensity of the magnetic field within which the currents have their origin. Furthermore, changes take place within the machine or generator itself, arising from the increase of the internal resistance, of the heating of the wires, and other causes. The variations referred to are also attended by changes in the amount of power required to drive the machine, and in speed of rotation of the latter, which changes again react upon the strength of the current generated.

It has been determined by experiment that the most efficient arrangement of a dynamo-electric generator—that is to say, the one which produces the greatest useful effect with a given expenditure of power—is that known as the "single-current" machine, in which the coils of the wire surrounding the armature, the stationary electro-magnets which maintain the magnetic field, and the external resistance are all included in the same circuit.

In the attempts which have hitherto been made to operate telegraphic circuits by means of dynamo-electric generators it has been considered impracticable to make use of the single-current machines, in consequence of the difficulties hereinbefore stated, and resort has been had to the class of generators known as "double-current" machines, in which the armature is wound with two wires, one of these being connected in the circuit with the field-magnets, and the other with the exterior circuit, in which the work is to be done; or else two separate generators have been coupled together, one being a single-current machine, whose function it is to polarize its own field-magnets and also those of the other generator, while the armature of the latter supplied the current to the exterior circuit.

In a prior application for Letters Patent, filed in the Patent Office by me on the 19th day of November, 1880, I have described an apparatus whereby the obstacles which have hitherto prevented the general use of the more efficient, simple, and economical single-current machines for telegraphic purposes are overcome, by the use of which apparatus I am enabled to produce therefrom uniform and constant currents over any required number of telegraph-lines of equal or of widely differing lengths, which may be operated by alternately breaking and closing the circuit in the usual manner.

The object of my present invention is to provide certain improved appliances whereby the said dynamo-electric apparatus may be conveniently and economically applied to use under the various conditions which arise in the operation of the telegraph circuits, especially when organized into an extensive system.

In the accompanying drawing groups of apparatus are shown, situated at a number of different stations, more or less widely separated from each other, which stations are designated in the diagram by different letters of the alphabet. For convenience in distinguishing the several groups upon the drawing they are bounded by dotted lines, which separate them from each other.

Station A, which forms the central and principal group of apparatus, represents a main station, from which radiate a number of telegraph-lines extending in various directions, all of which are supplied with constant currents of electricity by means of a single dynamo-electric generator, $d$. This generator is of the construction usually designated as a "single-current machine," in which the field-magnets and the rotating armature are both included in the same circuit. The terminals of the generator, which are usually termed the "positive" and "negative" poles, and which are indicated by the algebraic signs $+$ and $-$ upon the drawings, are directly connected with each other by a shunt-circuit, $c$, in which is included an adjustable rheostat, $w$. The positive pole of the generator is connected with the earth at $g$ at the central station by a suitable conductor, the resistance of which should be made as small as possible. A wire extends from the negative pole of the generator to a binding-screw or other similar attachment, $o$, upon a metallic bar, $b$, to which bar are electrically connected the several circuits which are to be supplied with electric currents from the generator $d$. I have shown in the drawing eight different circuits thus connected to the generator $d$, which will serve as types of the different conditions under which the work in the several circuits is required to be performed.

Line No. 1 passes through a key, $k^5$, and a main-line sounder, $r^5$, at station A, and thence goes to station G, which is a way-station, equipped with a key, $k^8$, and a main-line box-sounder, $r^8$. From station G the line extends to another terminal station, B, where it passes through a main-line sounder, $r^{10}$, and key $k^{10}$, and terminates at the metallic bar $b^2$, which is connected with the positive pole of a dynamo-electric generator, $d^2$, at that station, the other pole thereof being normally connected to the earth at $g'$. Line No. 2 in like manner passes through a key, $k^4$, and main-line sounder $r^4$ at station A, and extends directly to the same station B, without passing through the way-station G. At station B it traverses the main-line sounder $r^9$ and key $k^9$, and terminates, like No. 1, upon the bar $b^2$. Thus it will be seen that wires No. 1 and 2 are supplied with electricity by a dynamo-generator at each terminal station, one generator having its negative and the other its positive pole directed to the line, while the opposite poles of both are connected to the earth. Line No. 3 is a local circuit, and passes through the sounder $s^3$ and the contact-lever of relay $r^3$, and thence to the earth at $g^3$. Line No. 4 passes first through the relay $r^3$ at station A, and thence through the key $k^6$ and main-line sounder $r^6$ at way-station H, and from thence to key $k^7$ and main-line instrument $r^7$ of terminal station I, and, finally, to the earth at $g^4$. Line No. 5 is a local line, similar to line No. 3, but of considerably greater length or resistance, terminating at the earth $g^5$. Line No. 6 passes through key $k^2$ and relay $r^2$ at station A, and thence to relay $r^{14}$ and key $k^{14}$ at station F, and thence to relay $r^{15}$ and key $k^{15}$ at terminal station C, and thence to the earth at $g^6$. The relay $r^{14}$ at station F operates a sounder, $s^{14}$, by means of a local battery, $l$, in a manner well understood. Line No. 7 is a secondary circuit, which is operated, in connection with line No. 8, as hereinafter explained. Line No. 8 passes through key $k'$ and relay $r'$ at station A, thence to key $k^{12}$ and relay $r^{12}$ at way-station D, and thence to key $k^{13}$ and relay $r^{13}$ at terminal station E, and thence to the earth at $g^8$. Line No. 7, hereinbefore referred to, serves as a local circuit for the three last-named relays at stations A, D, and E. It goes first to sounder $s'$, thence through the contact-lever of relay $r'$, thence to sounder $s^{12}$ and contact-lever of relay $r^{12}$ at station D, and thence to sounder $s^{13}$ and contact-lever of relay $r^{13}$ at station E, and thence to the earth at $g^8$, thus forming another circuit parallel to No. 8.

It will be understood from the above description that by manipulating either of the three keys at the different stations upon line No. 8 the signals thus transmitted will be repeated upon the three sounders in line No. 7, while, on the other hand, by means of the keys $k\ k$, which are placed in line No. 7, the signals will be received upon all the local sounders without in any way affecting the working of line No. 8.

It will be obvious from the description which has been given of the several lines designated as Nos. 1 to 8 that their normal resistance differs very widely, both by reason of their different lengths and of the varying number of instruments and the unequal resistances of the instruments themselves. For this reason the normal tendency of the electric current generated by the dynamo-machine $d$ would be to divide itself among the eight circuits inversely, in proportion to their several resistances. This distribution would, however, produce a current upon the shorter lines which would be far more powerful than is either necessary or desirable. For this reason I prefer to insert rheostats or artificial resistances in all except the longest circuits, or those having the highest normal resistance. For example, we may suppose line No. 1 to have a resistance of five thousand five hundred units, No. 2 six thousand units, No. 4 five thousand units, and No. 6 six thousand units, which total is in each case inclusive of the resistances of the line, the instruments, and the connections. If these four were the only lines to be supplied, the distribution of the current among them would be nearly enough equal for all practical purposes; but in addition to these lines we have also No. 3, which is a local line, including only the resistance of the sounder $s^3$, which amounts to not more than three or four units; No. 5, which is a local line of greater length, and may have a resistance of, say, fifty units in the line and fifty more in the instrument $s^2$; also the lines 7 and 8, one of which has a total of one thousand six hundred units, and the other three thousand. These two last-named lines are supposed to be of the same length; but the difference in resistance arises from the character of the instruments included in the respective circuits, the several instruments in line No. 7 being sounders of small resistance, and in line No. 8 relays of large resistance.

For the purpose of insuring a practically equal distribution of the electric current in all the lines connected with the generator, artificial resistances are inserted in all shorter lines to sufficient amount to make them approximately equal to the longer ones. For example, line No. 3, whose resistance is practically so small that it may be considered nothing, is provided with a rheostat, $x^3$, of six thousand units. Local line No. 5, having normally considerable resistance of its own, requires but four thousand units in its rheostat $x^5$. Line No. 7 is provided with a rheostat, $x^7$, of one thousand units, and line No. 8 with a rheostat, $x^8$, of two thousand units.

It will be observed that the total resistance of line No. 8 is therefore five thousand units, while that of line No. 7 is only about half that amount, by reason of which the strength of current in line No. 7 would be about double that of line No. 8. In this way I am able to provide the strong current which is needed to work sounders and the weaker current which is required for relays from one and the same source.

By inserting a key, K, between the positive pole of the dynamo-electric generator $d$ and the earth at $g$, means are provided by which any required communication can be simultaneously transmitted over each of the eight circuits, hereinbefore described, and which are connected with the negative pole of the generator $d$.

The dynamo-electric generator $d^2$ at station B is connected with the earth at $g'$ through the commutator or switch-peg $p$. By withdrawing the latter and inserting it at $p^2$ the generator will be disconnected from the earth at $g'$, and a connection will be formed between the negative pole of the generator and the line 9, which extends to station C, having connected to it key $k^{11}$ and relay $r^{11}$ at station B and relay $r^{16}$ at station C, in which case the manipulation of the key $k^{11}$ will produce signals on all the instruments in lines No. 1 and No. 2, as well as upon the instrument $r^{16}$ in No. 9. Under this arrangement the generator $d^2$ is not connected with the earth at station B, (which is its own station;) but its positive pole is to earth at station A and its negative pole at station C.

At station C, I have shown another dynamo-electric generator, $d'$, which serves to supply a current for actuating the sounders or other local instruments attached to the relays of main lines Nos. 6 and 9, which come from station A and station G, respectively. The sounders thus operated are designated at $s^{15}$ and $s^{16}$, and their arrangement with reference to the relays, as well as the manner in which rheostats are inserted to modify the strength of the current in the different local circuits, is precisely similar to that already explained in connection with lines Nos. 3 and 5 at station A, and need not be further described.

When a number of different lines and stations are connected together in the manner which has been hereinbefore described, so as to be capable of being operated by a single current from a dynamo-electric generator at each main station, it is essential that a certain proportion should always be maintained between the joint resistance of the several lines supplied by the generator, the resistance of the generator itself—that is to say, of its armature-coils and field-magnets—the resistance of the shunt-wire, which connects the positive and negative poles of the generator, and the electro-motive force of the generator. For example, in the system which has been described the longest lines connected with the generator have each a total resistance of from five thousand to six thousand units, which, roughly speaking, is equivalent to an ordinary telegraph-line of three hundred miles in length, the joint resistance of the eight circuits being about seven hundred units. In this case good results will be obtained by the use of a dynamo-electric generator having a total internal resistance in the armature and field-magnets of about one-half of a unit and an electro-motive of, say, sixty volts. The total resistance of the shunt $c$ in this case would need to be from one to two units. The resistance of the shunt must in all cases bear a certain proportion to the other resistances in the system in order to obtain the best results. It must in all cases be greater than the internal resistance of the generator and less than the joint resistance of the whole number of circuits supplied by the generator. Under this organization the whole system becomes automatically self-regulating. For example, if an additional circuit is connected with the bar $b$, the joint resistance of the whole group of circuits is diminished, and with a given electro-motive force in the generator the total strength of current passing through the field-magnets and the armature will necessarily be increased. This increase again reacts to augment the electro-motive force by rendering the armature and field-magnets more powerfully magnetic, whereby an additional quantity of electricity is generated, which is just sufficient to supply the requirements of the additional circuit. This principle of operation is set forth in detail in my prior applications for Letters Patent heretofore filed, and need not, therefore, be enlarged upon in this place.

A different application of the shunt-circuit, involving the same general principle, is shown in the drawing in connection with the generator $d^2$ at station B. It has already been stated that this generator may be so connected that one of its earth terminals is at station A and the other at station C; but it will sometimes occur, owing to the great resistance of the circuit through which the generator is compelled to work, that the proportion of the shunt-circuit $c^2$ to the generator must be made inconveniently great, in order that sufficient current may be supplied to the said lines, by which increase of resistance the heating effect of the current in the shunt is greatly augmented. If, however, a commutator-peg be inserted at $p'$, whereby the negative pole of the generator is connected to the earth at $g^7$ through an adjustable rheostat, $w^2$, a branch circuit is formed, which constitutes an additional shunt, passing through the earth from $g^7$ to $g$, and thus enables the resistance of the shunt $c^2$ to be made smaller than would otherwise be possible without giving rise to practical inconveniences. It will readily be understood that the resistance of the two permanent shunts may be readily adjusted with reference to each other, so that any desired proportion of the current will pass through each one.

I sometimes prefer to make use of two or more shunt-circuits, arranged in multiple arc with each other, having different normal resistances, and to employ a suitable commutator in connection therewith, whereby any one or more of the shunts may be thrown into action to the exclusion of the others. The principle of this arrangement, however, does not differ from that of a single shunt having an adjustable resistance inserted therein. Two such shunt-circuits, in multiple arc with each other, are shown at station A, in which the supplementary shunt $c'$ is provided with an adjustable resistance, $w'$, and a switch, Sw, for throwing it into and out of circuit. In case two or more shunts are thus arranged in multiple arc, they are all traversed by the current in the same direction, and the direction of the current in any single shunt cannot be changed except by changing the polarity of the entire group.

I claim as my invention—

1. The combination, substantially as hereinbefore set forth, of a dynamo-electric generator, a constantly-closed shunt-circuit connecting the opposite poles of said generator, two parallel lines or circuits connected to the said generator in multiple arc with each other and with the said closed shunt-circuit, two or more relays having their helices included in one of said parallel circuits and their circuit-breaking devices in the other parallel circuit, and one or more signaling-keys in each of said parallel circuits.

2. The combination, substantially as hereinbefore set forth, in a dynamo-electric generator, of a revolving armature-coil and a stationary field-magnet, both of which are included in the same circuit with the exterior resistance, two or more independent shunt-circuits, which connect the opposite poles of the generator with each other, and thereby act to keep the circuit of the armature and field-magnet continuously closed irrespective of the condition of the exterior or working circuits, and means for adjusting or regulating the resistance of said shunt-circuits with reference to each other.

3. The combination, substantially as hereinbefore set forth, of a dynamo-electric generator, a constantly-closed shunt-circuit connecting the opposite poles of said generator, one or more main lines extending from one pole of said generator to one or more distant stations, and a commutator, whereby the opposite pole of said generator may be connected to the earth either with or without an interposed resistance, or to another main line leading to another distant station.

Signed by me this 16th day of December, A. D. 1880.

ORAZIO LUGO.

Witnesses:
FRANK L. POPE,
MILLER C. EARL.